United States Patent [19]

Stockton

[11] Patent Number: 4,630,838
[45] Date of Patent: Dec. 23, 1986

[54] CARRIER FOR SHEET MATERIAL, WALL PANELING OR THE LIKE

[76] Inventor: Edward Stockton, 5202 Meyers Ave., Eureka, Calif. 95501

[21] Appl. No.: 648,985

[22] Filed: Sep. 10, 1984

[51] Int. Cl.$^4$ ............................................. B62B 3/10
[52] U.S. Cl. ........................... 280/47.17; 280/79.1 A; 294/15
[58] Field of Search ............... 280/47.16, 47.33, 47.17, 280/47.3, 47.13 R, 47.34, 47.24, 79.3, 79.1, 79.1 A; 294/15, 26

[56] References Cited

U.S. PATENT DOCUMENTS

| | | | |
|---|---|---|---|
| 394,385 | 12/1888 | McMillin | 280/47.17 |
| 2,291,474 | 7/1942 | Kazmbach | 280/47.13 R |
| 2,399,786 | 5/1946 | Caton | 294/15 |
| 3,841,651 | 10/1974 | Bigney | 280/47.16 |
| 4,030,768 | 6/1977 | Lugash | 280/47.17 |
| 4,177,911 | 12/1979 | Griffin | 294/15 |
| 4,488,733 | 12/1984 | Hellsten | 280/47.16 |

FOREIGN PATENT DOCUMENTS 0735499  5/1980  U.S.S.R. ................... 294/15

Primary Examiner—David M. Mitchell
Attorney, Agent, or Firm—Diller, Ramik & Wight

[57] ABSTRACT

This disclosure is directed to a carrier, both wheeled and wheelless for transporting relatively large sheets of relatively thin material such as wall panelling, wallboard, composite board, sheetrock or the like, the carrier including a generally inverted U-shaped handle, having downwardly diverging legs whose ends are connected to a generally L-shaped elongated supporting bar upon which lower edges of the sheet material rests, the latter being the basic carrier which may further include an abutment plate or a biting plate carried at one end of the elongated supporting bar and being movable between a position in which it either abuttingly contacts upright edges of the sheet material to prevent the same from sliding edgewise from the elongated supporting bar or digs into lower edges of the sheet material to similarly prevent the latter from sliding off the elongated supporting bar, and at least two wheels supported by the elongated supporting bar, one of the wheels being disposed with its axis in fixed normal relationship to the longitudinal axis of the elongated supporting bar, and the remaining wheel having a swivel axis to permit full 360° rotation.

7 Claims, 6 Drawing Figures

CARRIER FOR SHEET MATERIAL, WALL PANELING OR THE LIKE

The present invention is directed to a novel and unobvious carrier which is designed to aid the builder in carrying relatively large and/or cumbersome material, such as plywood, sheetrock, doors, windows, wall panelling, wallboard, composite board and the like. As an example, a person would normally carry a 4'×8' plywood sheet by grasping the same midway along the 8' length sides, one hand at an opposite edge and carry the sheet with the shorter 4' edges leading and trailing. The hand supporting the lower longitudinal edge is normally turned palm out while the hand on the upper edge is normally turned palm down, and if balance is maintained and the sheet is not excessively heavy this mode of transport is not overly burdensome. However, if a person wishes to transport two or three or four such 4'×8' sheets simultaneously or even a single sheet up stairs, steps or inclines, problems obviously occur from the standpoint of the excess weight involved, the relative shifting between adjoining sheets and the natural adverse effect of gravity on the sheets when they are moved along inclined surfaces. Hence, it is with the latter problems in mind that the present carrier has been invented.

Carriers, wheeled or wheelless for variety of materials are relatively well known, as for example, the stock pick-up and carrier truck of U.S. Pat. No. 2,466,148 of Burg issued Apr. 5, 1949; the truck of U.S. Pat. No. 385,181 of M. Huntley issued June 26, 1888; the collapsible suitcase carrier of U.S. Pat. No. 3,612,563 of E. A. Kazmark, Sr. issued Oct. 12, 1971; and the Double Duty Dolly of U.S. Pat. No. 2,739,007 of H. F. Rauterberg issued Mar. 20, 1956. However, none of these prior art devices are constructed such that one or more sheets or panels can be placed upon a carrier in such fashion that a person can grasp a handle of the carrier with one hand and either lift the carrier and the associated sheeting with relative comfort, ease and efficiency, or similarly roll the carrier along a supporting surface, as will be more fully apparent hereinafter.

It is therefore a primary object of the present invention to provide a novel carrier which overcomes the disadvantages heretofore noted, particularly with respect to the prior art set forth herein, for transporting relatively large sheets of materials such as wall panelling, wallboard, composite board, sheetrock or the like, the carrier including a generally inverted U-shaped handle defined by a pair of legs spanned at upper ends thereof by a gripping handle portion, lower ends of the legs being spanned by an elongated supporting bar of a generally L-shaped cross-sectional configuration, and the latter and the gripping handle being disposed on opposite sides of a plane through lower leg portions of the U-shaped handle which facilitates balance and ease of carrying.

A further object of this invention is to provide a novel carrier as aforesaid including a plate at one end of the elongated supporting bar for abutting upright edges of sheets supported thereon to prevent the same from sliding edgewise off the elongated supporting bar during operation.

Still another object of this invention is to provide a novel carrier as aforesaid wherein the elongated bar is provided at one of its ends with a biting plate having a generally sharp upper edge which bites into lower edges of sheet material placed upon the elongated bar to prevent the sheet material from sliding therefrom.

A further object of this invention is to provide a novel carrier of the type heretofore described wherein either the abutment plate or the biting plate is movable between operative and inoperative positions by an over center connection to the elongated bar.

Still another object of this invention is to provide a novel carrier of the type aforesaid wherein the elongated bar includes at least a pair of wheels, one of the wheels having a fixed axis transverse to the longitudinal center line of the elongated bar, and the other wheel being mounted for full 360° rotation about a vertical axis.

With the above and other objects in view that will hereinafter appear, the nature of the invention will be more clearly understood by reference to the following detailed description, the appended claims and the several views illustrated in the accompanying drawings.

IN THE DRAWINGS

Figure 1:
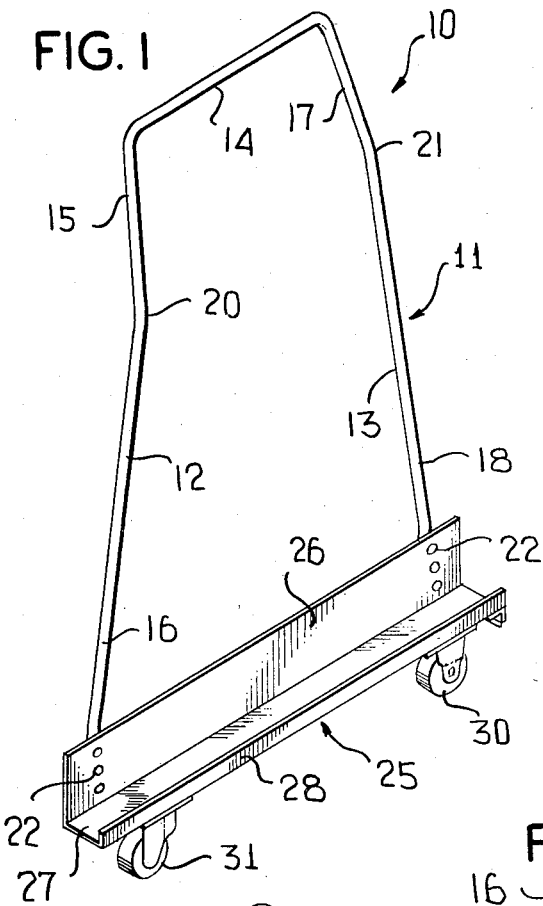
FIG. 1 is a perspective view of a novel carrier constructed in accordance with this invention and illustrates a generally inverted U-shaped handle having lower ends connected to a elongated L-shaped supporting bar carrying a pair of wheels.

A novel carrier constructed in accordance with this invention is generally designated by the reference numeral 10 and is particularly adapted for transporting relatively large sheets S (FIG. 2) of relatively thin material, such as wall panelling, wallboard, composite board, sheetrock, doors, windows, or most any material which is relatively cumbersome to grip and balance during transport. Typically of such material might be, for example, a 4'×8' sheet of panelling, sheetrock or the like which is normally carried in an unassisted fashion in the manner described earlier, including the attendant disadvantages thereof. Hence, in keeping with the present invention the carrier 10 is designed to preclude all such disadvantages and permit the sheet(s) to be readily and efficiently carried off the ground or transported therealong as described more fully hereinafter.

The carrier 10 includes a generally inverted U-shaped handle 11, defined by a pair of legs 12, 13, spanned at upper ends thereof by a gripping handle portion 14. Each leg 12, 13 has respective upper and lower leg portions 15, 16, 17 and 18 joined to each other by a respective radius portion 20, 21. The overall U-shaped handle diverges downwardly by the degree of divergence is greater between the leg portions 16, 18 than it is between the leg portions 15, 17, and is readily apparent from FIG. 1.

Figure 2:
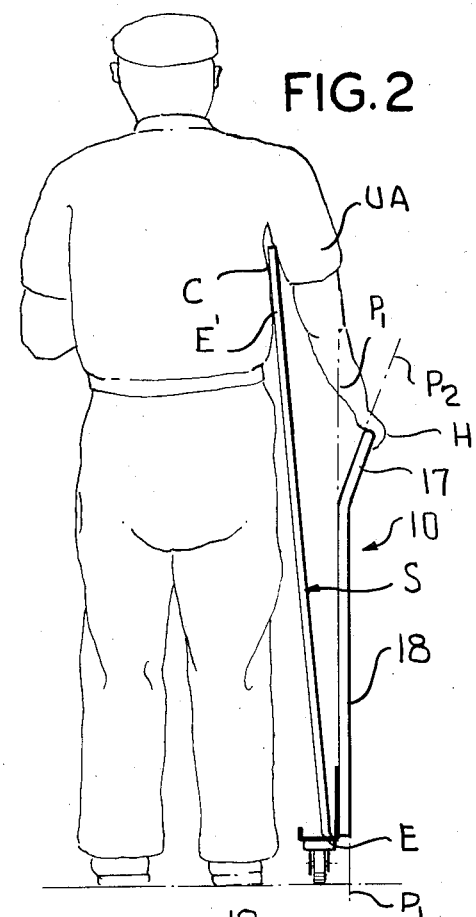
FIG. 2 is a rear perspective view, and illustrates the manner in which a person rolls the carrier along the ground to transport sheets supported thereby.

The lower leg portions 16, 18 are disposed in a generally common first plane P1 (FIG. 2) while the upper leg portion (15, 17) are disposed in a generally common second plane P2 (FIG. 2). Thus the upper leg portions 15, 17 and the gripping handle portion 14 therebetween lie to one side of the plane P1 which in FIG. 2 is to the right thereof which functions in a manner to be described more fully hereinafter to effect optimum operation of the carrier 10.

The lower leg portion 16, 18 terminate in lower terminal ends (unnumbered) and means 22 in the form of threaded bolts and nuts are provided for securing the terminal ends of the legs 16, 17 to means 25 for edge-supporting thereupon the relatively large sheets S. The edge-supporting means 25 is an elongated metallic supporting bar of generally L-shape or J-shape cross sectional configuration defined by a generally vertically disposed relatively spanning leg 26, a generally horizontally disposed relatively narrow supporting leg 27 and a relatively short longitudinal lip 28. The elongated supporting bar 25 spans the distance between the terminal ends (unnumbered) of the lower leg portion 16, 18 and is, of course, secured thereto by the fastening means 22 in a conventional manner. The sheets S are supported with bottom edges E thereof resting upon the supporting surface 27, as is most evident in FIGS. 2-5 of the drawings. The length of the elongated bar 25 is approximately two feet long and thus each sheet S if centrally located upon the supporting leg 27 would overhang the elongated bar 25 by three feet at each end if, of course, the 8' length is positioned upon the supporting leg 27, as is intended by the present invention. In other words, the sheets S are positioned upon the elongated bar 25 the 4' dimension of a 4'×8' sheet is vertical or upward whereas the 8' dimension is horizontal.

It is to be particularly noted that the supporting leg 27 is located at a side opposite the plane P1 as that of the handgrip portion 14 and the upper leg portions 15, 17 of the handle 11. Because of the latter relationship the carrier 10 can be utilized by a person or individual I (FIG. 1) by simply grasping the handgrip portion 14 in the manner shown in FIG. 2 by the hand H of the individual or person I. In this position upper edges E' of the sheets S are sandwiched between the side of the person's ribcage C and the inside of the person's upper arm UA. When the person I wishes to lift the carrier 10 off the ground G (FIG. 2) or roll the same along the ground G, he need but move his upper arm UA closer to his side ribcage C and this effectively grasps the upper edges E' of the sheets S and the carrier 10 can be moved along the ground G. Obviously, if the carrier 10 is lifted bodily off the ground G, the weight of the sheets S have a tendency to pull the individual's upper arm UA toward his ribcage C automatically and thus the edges E' are virtually automatically gripped during the lifting operation. Thus, either by carrying the carrier 10 or wheeling the carrier 10 the offset of the handgrip portion 14 and the upper leg portions 15, 17 relative to the plane P1 and the disposition thereof to a side opposite the plane P1 as compared to that of the elongated bar 25 effects the automatic gripping action heretofore noted which is, of course, an important part of the present invention.

Figure 3:
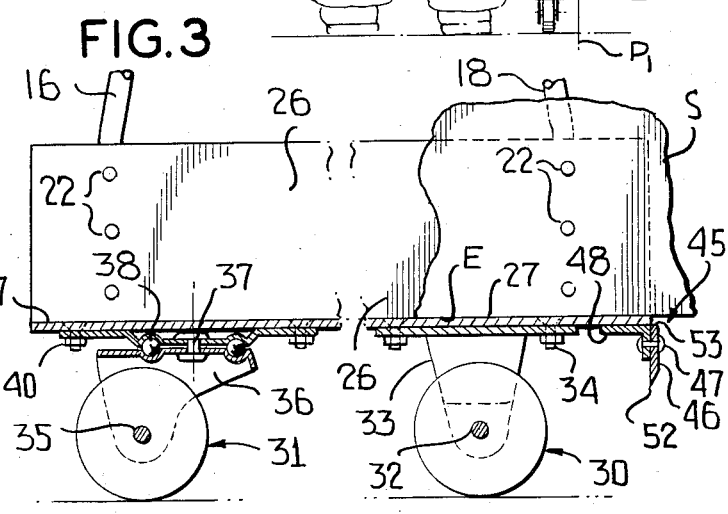
FIG. 3 is a fragmentary elevational view of the lower end portion of the carrier and illustrates the manner in which one of the wheels has a fixed axis transverse to the longitudinal axis of the elongated supporting bar and the other wheel is mounted for full 360° rotation about a vertical axis.

In order to utilize the carrier 10 as a wheeled carrier, the same is provided with a pair of wheels 30, 31 (FIGS. 1 and 3). The wheel 30 has a shaft 32 whose axis is transverse to the longitudinal axis of the elongated bar 25 and through a suitable bracket 33 and fasteners 34, the wheel 30 is fixed to the underside (unnumbered) of the narrow supporting leg 26. That is, the axis of the shaft 32 is at all times normal to the longitudinal axis of the elongated bar 25. The latter is to be distinguished from the wheel 31 which not only includes a shaft 35 connected to a bracket 36 but the bracket 36 is a swivel-type or castortype bracket having a vertical axis 37 and conventional ball rollers 38 with, of course, the bracket 36 also being secured to the underside (unnumbered) of the narrow supporting leg 26 by conventional fasteners 40. The castor or swivel arrangement, including the vertical pivot 37 of the bracket 36 permits the wheel 31 to rotate 360°. Thus, at any time that the carrier 10 is being rolled along the ground G by means of the wheels 31, 32, the swivel wheel 31 permits the carrier 10 to be or turned or guided with ease thus imparting directional stability to the carrier 10.

Figures 4, 6:
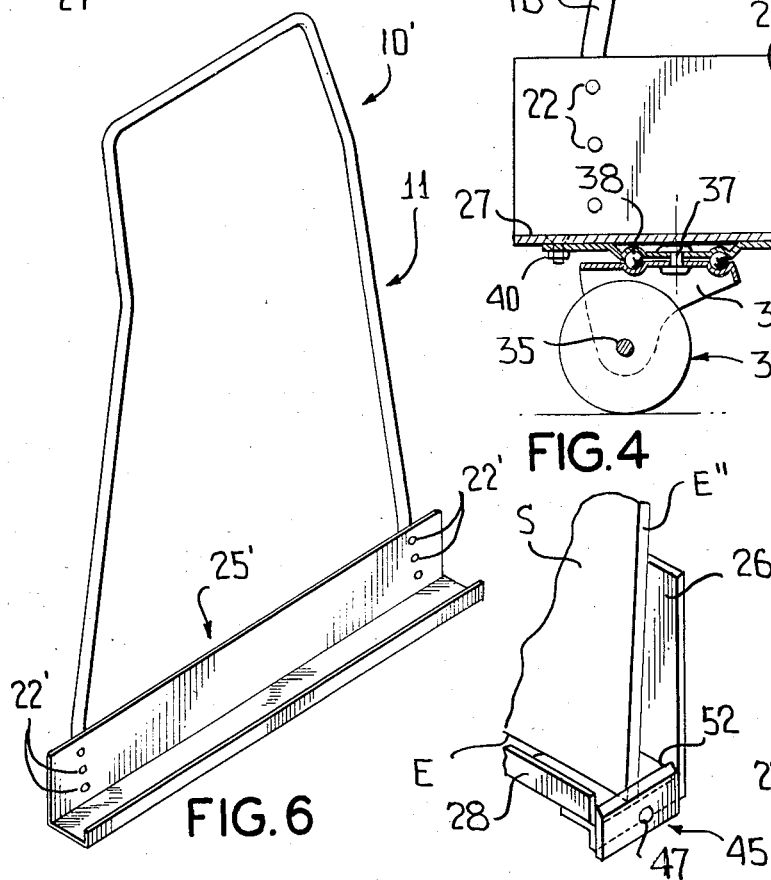
FIG. 4 is a fragmentary perspective view of one end of the elongated supporting bar and illustrates an abutment/biting plate which precludes sheet material from slipping edgewise from the elongated supporting bar during transport. particularly along inclined surfaces.
FIG. 6 is a perspective view of a carrier without wheels.
Figure 5:
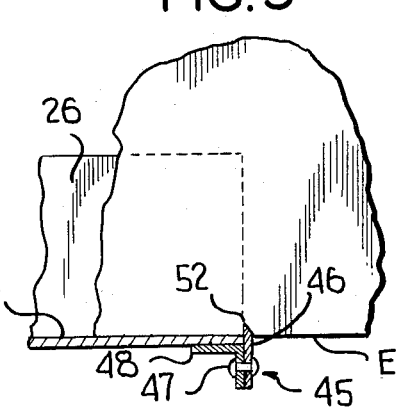
FIG. 5 is a fragmentary elevational view similar to FIG. 4 but illustrates the manner in which a sharp edge of the abutment/biting plate digs into a lower edge of the sheet material to prevent the same from sliding off the elongated supporting bar.

Reference is now made particularly to FIGS. 3-5 of the drawings which fully illustrate means generally designated by the reference numeral 45 at an end of the elongated bar 25 for either abuttingly contacting upright edges E'' (FIGS. 4) or biting into the lower edges E (FIG. 5) of the sheet or sheets S depending, of course, in the manner that the sheets S are placed on the supporting leg 27. The abutting or biting means are each formed by a relatively narrow rectangular metallic plate 46, connected by a headed rivet 47 to an inverted L-shaped bracket 48 which is in turn secured in a conventional manner to the lower surface (unnumbered) of the narrow supporting leg 27. The location of the pivot 47 is off set from the total distance between a sharp edge 52 of the plate 46 and an opposite edge 53 thereof. Stated otherwise, the pivot 47 is closer to the edge 53 than to the edge 52.

FIG. 3 illustrates the abutment or biting plate 46 positioned in its inoperative position, namely, with the edge 52 lowermost and the edge 53 below a plane through the upper surface of the narrow supporting leg 27. In this position, a sheet S (FIG. 3) can rest with its edge E directly upon the upper surface (unnumbered) of the narrow supporting leg 26 and can, of course, project beyond and to the right of the means 45 in an unobstructed manner because the edge 53 is uppermost, yet is below the plane of the narrow supporting leg 27. Thus a sheet S of 4'×8' can be placed equidistant upon the elongated supporting bar 25, projecting approximately three feet beyond each end of the elongated supporting bar 25 in an unobstructed manner relative to the means 45. Of course, such sheet would also not be constrained against movement and would be free to move along the length of the elongated bar 25 although, of course, slippage laterally therefrom would be precluded by the outstanding lip 28.

In order to prevent the sheet or sheets S from moving longitudinally beyond right-hand end, as viewed in FIG. 3, of the elongated supporting bar 25, the abutment or biting plate 52 is moved from its inoperative position (FIG. 3) to the operative position shown in FIG. 4. In this figure one of the sheets S is shown with its upright edge E'' simply abutting the edge 52 which now, of course, projects above the plane of the narrow supporting leg 27 having been pivoted thereto about the pivot pin 47. Thus, the abutment plate 46 abuts the edge E' and prevents the sheet S from moving to the right in FIG. 4 accidentally or otherwise. This is particularly advantageous when the carrier 10 is being used to move the sheets S along an incline at which point the elongated bar 25 would also be inclined, particularly if it were being carried, as for example, upstairs. If the sheet S of FIG. 4 were positioned as shown therein the edge E" would be the trailing edge along the incline, thus gravity would be effective to push the sheet S toward the right or against the abutting plate 45 in FIG. 4, thereby preventing rightward movement. The plate 46 is utilized as shown in FIG. 4 when the sheet S is relative short and would not project appreciably beyond the unillustrated end of the elongated bar 25. As an example, if the sheet S of FIG. 4 were 4'×8' and it was positioned as shown in FIG. 4 with the long edge E upon the narrow supporting leg 27 only two feet of the sheet S would be supported (the length of the elongated bar 25) and six feet would project therebeyond. This would be a relative difficult arrangement to convey because the very weight of the sheet S would tend to cock or tip it relatively to the surface 27, as opposed to lying perfectly flat thereupon. Thus, a person would undoubtedly have to push down on the sheet S of FIG. 4 to hold it against the elongated bar 25 while moving the same along the ground or carrying the same in this unbalanced condition, and this would be relatively difficult if not impossible.

To alleviate the problem last mentioned, the edge 52 of the abutment or biting plate 46 is relatively sharp so that it will bite into the edge E of a sheet S (FIG. 5) which is in bridging relationship or spanning relationship thereto. For example, in FIG. 5 the sheet S is presumed to be a '×8' sign sheet on its long or 8' side edge E and is centrally located upon the elongated bar 25 which means that three feet project beyond each end of the elongated bar 25. In this fashion, the carrier 10 can be lifted, rolled or otherwise moved along perfectly smooth surfaces, along inclines, in virtually any direction be it forward, backward or otherwise, and the biting arrangement of the edge 52 of the plate 46 into the edge E of the sheet S (FIG. 5) prevents the sheet S from being dislodged leftward or rightward in FIG. 5 from the elongated bar 25.

Reference is now made to FIG. 6 of the drawing which illustrates the basic embodiment of the invention in which a carrier 10' is illustrated and all components thereof are identical to the carrier 10 of FIG. 1. In this case the carrier 10' is not, of course, designed for rolling upon the ground G and hence lacks the wheels 30, 31 of the carrier 10 and need not necessarily be provided with the abutment or biting means 45. Thus, in the simplest version the carrier 10' merely includes the handle 11' and the elongated bar 25' along with, of course, the necessary fastening means 22' for holding the two elements together. It is, of course, in further keeping with this invention to provide the wheeless carrier 10' of FIG. 6 with the abutment/biting means 45 of FIGS. 3-5.

Although only a preferred embodiment of the invention has been specifically illustrated and described herein, it is to be understood that minor variations may be made in the apparatus without departing from the spirit and scope of the invention as defined in the appended claims.

What is claimed is:

1. A carrier particularly adapted for transporting relatively large sheets of relatively thin material such as wall panelling, wallboard, composite board, sheetrock or the like comprising a generally inverted U-shaped handle defined by a pair of legs spanned at upper ends thereof by a gripping handle portion, each leg having upper and lower leg portions integrally joined to each other by a radius portion therebetween, said lower leg portions being disposed in a generally common first plane, said upper leg portions being disposed in a generally common second plane, said first and second planes being disposed at an included acute angle to each other as established by said radius portions, said lower leg portions being further disposed in upwardly converging relationship to each other, said lower leg portions having lower ends, means carried by said lower ends in spanning relationship thereto for edge-supporting thereupon relatively large sheets of relatively thin material, said edge-supporting means including an elongated bar of a generally L-shaped cross-sectional configuration defined by a generally vertically disposed spanning leg and a generally horizontally disposed relatively narrow supporting leg, means for securing said spanning leg to each of said leg lower ends, said elongated bar having opposite ends, means at one of said elongated bar ends for abuttingly contacting upright edges of sheets supported upon said narrow supporting leg when said narrow supporting leg is inclined to the horizontal thereby preventing sheets from sliding edgewise off said narrow supporting leg, said upright edges contacting means including an abutment plate disposed in generally transverse relationship to the longitudinal axis of said elongated bar, and means for eccentrically pivotally mounting said abutment plate relative to said elongated bar for movement of said abutment plate between a first inoperative position at which said abutment plate is disposed generally below a plane through an upper surface of said supporting leg and a second operative position at which said abutment plate is disposed generally above said upper surface plane.

2. A carrier particularly adapted for transporting relatively large sheets of relatively thin material such as wall panelling, wallboard, composite board, sheetrock or the like comprising a generally inverted U-shaped handle defined by a pair of legs spanned at upper ends thereof by a gripping handle portion, each leg having upper and lower leg portions integrally joined to each other by a radius portion therebetween, said lower leg portions being disposed in a generally common first plane, said upper leg portions being disposed in a generally common second plane, said first and second planes being disposed at an included acute angle to each other as established by said radius portions, said lower leg portions being further disposed in upwardly converging relationship to each other, said lower leg portions having lower ends, means carried by said lower ends in spanning relationship thereto for edge-supporting thereupon relatively large sheets of relatively thin material, said edge-supporting means including an elongated bar of a generally L-shaped cross-sectional configuration defined by a generally vertically disposed spanning leg and a generally horizontally disposed relatively narrow supporting leg, means for securing said spanning leg to each of said leg lower ends, said elongated bar having opposite ends, means at one of said elongated bar ends for biting into lower edges of sheets supported upon said narrow supporting leg when said narrow supporting leg is inclined to the horizontal thereby preventing sheets from sliding edgewise off said narrow supporting leg, said lower edges biting means including a biting plate disposed in generally transverse relationship to the longitudinal axis of said elongated bar, and means for eccentrically pivotally mounting said biting plate relative to said elongated bar for movement of said abutment plate between a first inoperative position at which said biting plate is disposed generally below a plane through an upper surface of said supporting leg and a second operative position at which said biting plate is disposed generally above said upper surface plane.

3. The carrier as defined in claim 2 wherein said biting plate has a generally sharp upper edge.

4. A wheeled carrier particularly adapted for transporting relatively large sheets of relatively thin material such as wall panelling, wallboard, composite board, sheetrock or the like comprising a generally inverted U-shaped handle defined by a pair of legs spanned at upper ends thereof by a gripping handle portion, each leg having upper and lower leg portions integrally joined to each other by a radius portion therebetween, said lower leg portions being disposed in a generally common first plane, said upper leg portions being disposed in a generally common second plane, said first and second planes being disposed at an included acute angle to each other as established by said radius portions, said lower leg portions being further disposed in upwardly converging relationship to each other, said lower leg portions having lower ends, means carried by said lower ends in spanning relationship thereto for edge-supporting thereupon relatively large sheets of relatively thin material, said edge-supporting means including an elongated bar of a generally L-shaped cross-sectional configuration defined by a generally vertically disposed spanning leg and a generally horizontally disposed relatively narrow supporting leg, means for securing said spanning leg to each of said leg lower ends, and a wheel beneath said supporting leg adjacent each leg lower end, said elongated bar having opposite ends, means at one of said elongated bar ends for abuttingly contacting upright edges of sheets supported upon said narrow supporting leg when said narrow supporting leg is inclined to the horizontal thereby preventing sheets from sliding edgewise off said narrow supporting leg, said upright edges contacting means including an abutment plate disposed in generally transverse relationship to the longitudinal axis of said elongated bar, and means for eccentrically pivotally mounting said abutment plate relative to said elongated bar for movement of said abutment plate between a first inoperative position at which said abutment plate is disposed generally below a plane through an upper surface of said supporting leg and a second operative position at which said abutment plate is disposed generally above said upper surface plane.

5. The wheeled carrier as defined in claim 4 wherein one of said wheels has a fixed axis of rotation transverse to the longitudinal direction of said elongated bar, and the other of said wheels is mounted for universal swivelling movement relative to said elongated bar.

6. A wheeled carrier particularly adapted for transporting relatively large sheets of relatively thin material such as wall panelling, wallboard, composite board, sheetrock or the like comprising a generally inverted U-shaped handle defined by a pair of legs spanned at upper ends thereof by a gripping handle portion, each leg having upper and lower leg portions integrally joined to each other by a radius portion therebetween, said lower leg portions being disposed in a generally common first plane, said upper leg portions being disposed in a generally common second plane, said first and second planes being disposed at an included acute angle to each other as established by said radius portions, said lower leg portions being further disposed in upwardly converging relationship to each other, said lower leg portions having lower ends, means carried by said lower ends in spanning relationship thereto for edge-supporting thereupon relatively large sheets of relatively thin material, said edge-supporting means including an elongated bar of a generally L-shaped cross-sectional configuration defined by a generally vertically disposed spanning leg and a generally horizontally disposed relatively narrow supporting leg, means for securing said spanning leg to each of said leg lower ends, and a wheel beneath said supporting leg adjacent each leg lower end, said elongated bar having opposite ends, means at one of said elongated bar ends for biting into lower edges of sheets supported upon said narrow supporting leg when said narrow supporting leg is inclined to the horizontal thereby preventing sheets from sliding edgewise off said narrow supporting leg, said lower edges biting means including a biting plate disposed in generally transverse relationship to the longitudinal axis of said elongated bar, and means for eccentrically pivotally mounting said biting plate relative to said elongated bar for movement of said abutment plate between a first inoperative position at which said biting plate is disposed generally below a plane through an upper surface of said supporting leg and a second operative position at which said biting plate is disposed generally above said upper surface plane.

7. The wheeled carrier as defined in claim 6 wherein one of said wheels has a fixed axis of rotation transverse to the longitudinal direction of said elongated bar, and the other of said wheels is mounted for universal swivelling movement relative to said elongated bar.

* * * * *